J. M. Youart,
Bee Hive.
No. 99,994. Patented Feb. 15, 1870.
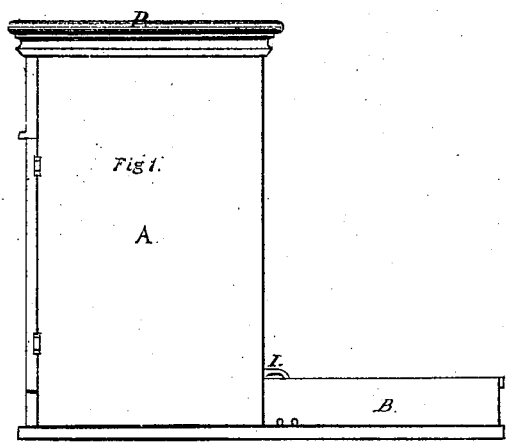
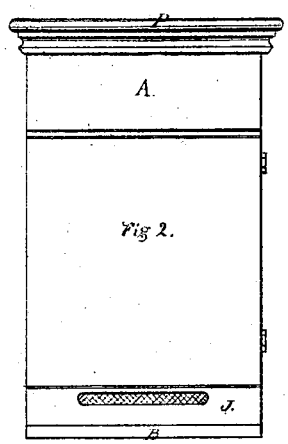
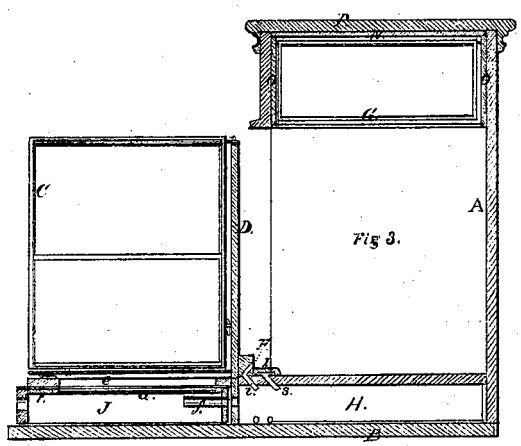
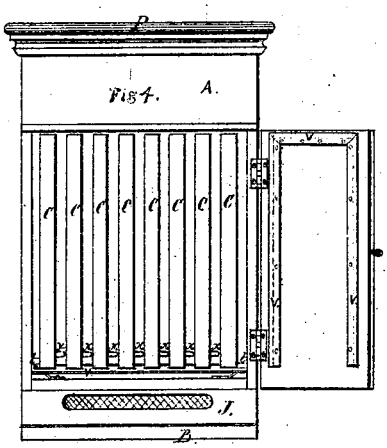
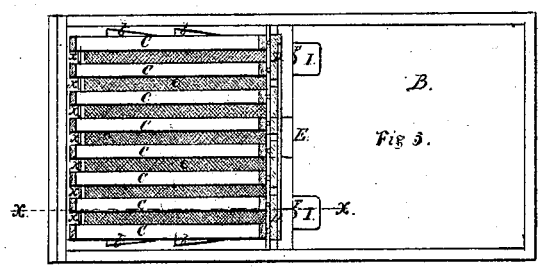
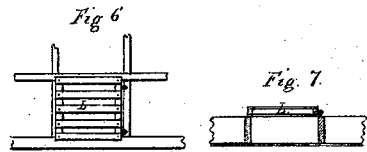
Witnesses
O. F. Mayhew
Wm. H. Loomis
John M. Youart
INVENTOR

United States Patent Office.

JOHN M. YOUART, OF INDIANAPOLIS, INDIANA.

Letters Patent No. 99,994, dated February 15, 1870.

IMPROVEMENT IN BEE-HIVES.

The Schedule referred to in these Letters Patent and making part of the same

I, JOHN M. YOUART, of Indianapolis, in the county of Marion, and State of Indiana, have invented certain Improvements in Bee-Hives, of which the following is a specification.

Nature and Objects of the Invention.

The first part of my invention relates to the construction and arrangement of the external case and base of the hive, combined with the arrangement and mode of hanging the movable comb frames, having for its object to afford more convenient access to the comb frames, for such purposes as may be required, with less liability to kill or disturb the bees.

The second part of my invention relates to the construction and arrangement of the dark chamber and moth and robber-bee trap in the base of the hive, having for its object to more completely control the operations of the robber bees, and to prevent the moth from depositing their eggs where the grubs will have access to the comb.

Description of the Accompanying Drawing.

Figure 1 is a side elevation of a bee-hive embodying my improvements.

Figure 2 is a rear elevation of the same.

Figure 3 is a vertical longitudinal section on the line $x\ x$, fig. 5.

Figure 4 is a view of the rear of the hive with the door open.

Figure 5 is a top view with the outer case removed.

Figures 6 and 7 are elevation and section views of the queen cages, for the hatching, care of, and convenient removal of the queen-bees.

General Description.

A is the outer case of the hive, and B, the base containing the moth and robber bee, dark chamber, and trap, which case and base should be made in a substantial manner to exclude insects injurious to the bees.

C are movable comb frames hung to pintles in the upright board D, as shown, and are made in any approved manner of constructing such frames.

The entrance for the bees to the hive is at E, fig. 5, midway between the entrances F to the moth and robber bee chamber and trap. From this entrance the bees can pass directly under the movable comb frame, and from thence up among them, or they may go up on the side of the frame board D, opposite that on which the frames C are hung, space being left between this board and the exterior case for this purpose, and also for the passage of the bees up to the surplus-honey frames G, without the necessity of their going among the bees in the lower part of the hive.

Vertical openings are also made in the frame board D, through which the bees may pass in among the comb frames C.

The upper part of the hive is furnished with small movable comb frames G, hung directly over and parallel with the comb frames C below. These frames may be hung by pintles in the upper corners of the frames in notches cut in the outer case, or they may be hung in a frame, O, that fits neatly inside the outer case, so that all the surplus-honey frames may be lifted out of the case at once, or if hung as described in either case, they may be removed separately.

The frames G are hung sufficiently above those below, to afford the requisite space for the bees to move freely between them.

The cap P of the exterior case is made removable, for convenient access to the surplus-honey frames, and a board, N, the size of the interior dimensions of the exterior case forms a movable top to the frame O, containing the surplus-honey frames G.

The base of the hive contains a dark chamber, H, in the front projecting part, and space for a drawer, J, immediately under the comb frames, that serves as a receptacle for the droppings of the bees, and also as a trap to retain robber bees and moths that find access to it.

The drawer J has an opening in its outer end to light it, the opening being covered with woven wire, to prevent the escape of the bees and moths that get into it.

The top of the drawer is covered with woven wire $a$, both to allow the droppings of the bees to descend into it and to prevent the moth from getting up to another woven wire, $e$, covering an opening in the top board of the base, thus effectually preventing them from depositing their eggs where they will be hatched by warmth from the bees, and preventing any grubs that do hatch from gaining access to the bees.

In case the hive is attacked by robber bees and the bees of the hive are unable to protect themselves, the entrance to the hive may be closed temporarily by a sliding shutter arranged for this purpose, and the slides that cover the entrances opened to the passages $i$, figs. 3 and 5, that lead into the dark chamber H, when the robbers will enter the chamber in their efforts to effect an entrance to the hive.

The moths, in accordance with their well-known habit to deposit their eggs in places inaccessible to their enemies and near some warmth that will hatch them, will, in search for such place, crawl under the blocks I, which are raised a little off the base for this purpose, and go thence down the passages $s$ into the dark chamber H. Holes through the partition separating chamber H and the space occupied by drawer J admit sufficient light to attract the attention of the robber bees and moths and through which in their efforts to either escape or gain access to the hive they will pass into the drawer J through tubes $f$, the latter projecting into the drawer to prevent their return and from which they cannot otherwise escape.

The drawer J may be readily drawn from the rear of the hive at any time for the removal of the droppings, to destroy the moths, or to allow the robber bees to escape, a movable board, $r$, covering the outer top part of the drawer for this purpose.

For the hatching, proper care of, and convenient handling of queen-bees, a frame subdivided into a number of small cages, as shown in figs. 6 and 7, each cage being provided with a door, L, is made to take the place of any one of the other movable frames.

My improvement in the construction of these cages consists in making the side wall and door of narrow strips of cane, and turning the smooth side of these inward, so that the queen bees shall not injure themselves by their efforts to escape as in cages covered with wire as usually built.

V are tin flanges attached to the base and door of the hive, as shown, to prevent the bees from sticking the case and door so that they cannot be moved or opened when desired. These flanges may also be applied to any other part of the hive requiring it for the same purpose.

The movable comb frames C are furnished with stops $x$ to hold them the proper distance apart on the outside, with the angular wires $t$ in the bottom rail, so that in pushing the case A back over the frames they will be closed together without danger of crushing the bees.

Claims.

I claim as my invention—

1. The combination of the vertically-slotted frame board D and swinging frames C, said frames being provided with loops, which are passed over pins on the board D, and are provided with metal guards $x$, as shown, all inclosed within the case A, substantially as set forth.

2. The arrangement of the board D and frames C, as above described, upon one end of the elongated hollow base B with screen $e$ and opening E, when said opening leads from the case A, into incline spaces at the base of the board D, from which spaces a narrow passage is formed for the bees up within the hive, between the board D and the front of the case A, substantially as set forth.

3. The elongated hollow base B with a central partition, one end forming a dark chamber, H, with openings leading into it from the side and covered openings I and tubes $i$ on the top, the other end provided with a screen-covered drawer, J, with the movable board $r$, all constructed as and for the purposes set forth.

4. The combination and arrangement of the base B with drawer J and chamber H, screen $e$, case A, with board D, frames C, honey frames G, cover N, and cap P, all constructed and used substantially as and for the purposes set forth.

JOHN M. YOUART.

Witnesses:
  O. F. MAYHEW,
  W. H. LOOMIS.